(12) United States Patent
Li et al.

(10) Patent No.: US 9,578,858 B2
(45) Date of Patent: Feb. 28, 2017

(54) HYBRID LED LIGHTING METHOD AND SYSTEM FOR CHICKEN COOPS

(71) Applicant: Hangzhou Langtuo Biotechnology Co., Ltd., Hangzhou (CN)

(72) Inventors: Xuke Li, Hangzhou (CN); Jinming Pan, Hangzhou (CN); Mingli Zhang, Hangzhou (CN); Jinsong Jiang, Hangzhou (CN); Fengjia Dai, Hangzhou (CN)

(73) Assignee: Hangzhou Langtuo Biotechnology Co., Ltd., Hangzhou (CN)

(*) Notice: Subject to any disclaimer, the term of this patent is extended or adjusted under 35 U.S.C. 154(b) by 0 days.

(21) Appl. No.: 14/429,884

(22) PCT Filed: Jan. 14, 2014

(86) PCT No.: PCT/CN2014/070558
§ 371 (c)(1),
(2) Date: Mar. 20, 2015

(87) PCT Pub. No.: WO2015/106379
PCT Pub. Date: Jul. 23, 2015

(65) Prior Publication Data
US 2016/0000046 A1    Jan. 7, 2016

(51) Int. Cl.
*A01K 31/20* (2006.01)
*A01K 31/18* (2006.01)
(Continued)

(52) U.S. Cl.
CPC ............ *A01K 31/20* (2013.01); *A01K 31/002* (2013.01); *A01K 31/18* (2013.01); *A01K 31/22* (2013.01);
(Continued)

(58) Field of Classification Search
CPC ...... A01K 31/18; A01K 31/00; A01K 31/002; A01K 31/005; A01K 31/20; A01K 31/22; A01K 45/00; F21V 33/00
See application file for complete search history.

(56) References Cited

U.S. PATENT DOCUMENTS 8,738,160 B2 * 5/2014 Bucove .................. A01G 7/045
                                                                    315/152
2003/0172878 A1 * 9/2003 El Halawani .......... A01K 45/00
                                                                    119/300
(Continued)

FOREIGN PATENT DOCUMENTS

CN     103283635 A  * 9/2013
CN     203233870 U    10/2013

OTHER PUBLICATIONS

CN 103283635 A translation by ProQuest, 12 pages.*

*Primary Examiner* — Monica Williams
(74) *Attorney, Agent, or Firm* — Tian IP & Technology, LLC.

(57) ABSTRACT

The present disclosure discloses a hybrid LED lighting method and system for chicken coops. For example, a closed or semi-open chicken coop is provided with the hybrid LED lightings including white LED beads and yellow LED beads in a mixing ratio of about 1:5 to about 5:1 in a regularly alternating manner. The average light intensity on the chicken cages' underside exposed to the light of the hybrid LED lighting is about 5 to about 30 Lux. The closed chicken coop is lit by a hybrid LED lighting every day during fattening period; the semi-open chicken coop is exposed to natural light in the daytime and lit by the hybrid LED lighting at night during fattening period. Implementation of the present disclosure improves growth of chickens, increases uniformity of chickens, and improves health and resistance to epidemic diseases.

10 Claims, 13 Drawing Sheets

(51) Int. Cl.
*A01K 31/00* (2006.01)
*A01K 45/00* (2006.01)
*F21V 33/00* (2006.01)
*A01K 31/22* (2006.01)
*F21Y 101/00* (2016.01)

(52) U.S. Cl.
CPC .............. A01K 45/00 (2013.01); F21V 33/00 (2013.01); *F21Y 2101/00* (2013.01); *F21Y 2113/13* (2016.08); *F21Y 2115/10* (2016.08)

(56) References Cited

U.S. PATENT DOCUMENTS

| | | | | |
|---|---|---|---|---|
| 2008/0013304 | A1* | 1/2008 | Cleary | A01G 7/045 362/154 |
| 2008/0302004 | A1* | 12/2008 | Lin | A01G 7/045 47/58.1 LS |
| 2009/0199470 | A1* | 8/2009 | Capen | A01G 7/045 47/58.1 LS |
| 2010/0287830 | A1* | 11/2010 | Chen | A01G 7/045 47/58.1 LS |
| 2012/0186524 | A1* | 7/2012 | Grajcar | A01K 31/005 119/6.8 |
| 2013/0016506 | A1* | 1/2013 | Odom, Jr. | A01K 31/18 362/231 |
| 2013/0271022 | A1* | 10/2013 | Pan | A01K 45/00 315/210 |
| 2015/0156992 | A1* | 6/2015 | Kasahara | A01K 31/00 426/2 |

* cited by examiner

HYBRID LED LIGHTING METHOD AND SYSTEM FOR CHICKEN COOPS

CROSS REFERENCE TO RELATED APPLICATION

This application is a national stage application of International application number PCT/CN2014/070558, filed Jan. 14, 2014, titled "HYBRID LED LIGHTING METHOD AND SYSTEM FOR CHICKEN COOPS," which is hereby incorporated by reference in its entirety.

TECHNICAL FIELD

The present disclosure relates to lighting methods and systems, and more particularly, to hybrid LED lighting methods and systems for chicken coops.

BACKGROUND

Chickens are sensitive to light. Any change of lighting conditions may affect the physiology, behavior, growth rate, etc. of chickens to a certain extent. It is a universal practice to blindly adopt supplemental lighting with a view to raising the economic benefits. However, blind supplemental lighting will not increase growth rate of chickens; instead, it may affect the growth and development and healthy and lower the quality of chicken.

Incandescent lamps and fluorescent lamp are commonly used for supplementing lights in the conventional art of light supplementation; but the source of the two lamps has the disadvantages of high energy consumption, short service life and poor controllability. Compared with conventional light sources, LED light sources have higher incident photon-to-current conversion efficiency, light utilization efficiency and energy saving effects. Therefore, it is highly advantageous to substitute conventional light sources with LED light sources.

There is no scientific standard guidance available for most farming enterprises or farming households to control light source, light intensity, duration, etc. of light supplementation; so they supplement light at their discretion, causing low yield and serious waste of resources, especially in selecting a LED light source. This is because there is a wide range of spectrums with great differences of LED light sources to choose from and an undesirable spectrum will produce unwanted stress in chickens, affecting chicken's health and growth. It is difficult to find a single-color light for LED lighting that can not only improve the production of egg, but also minimize energy consumption. The mainstream product in the market, LED white light, is cheap and of high luminous efficiency, but it has important defects for being composed of red light and blue light and is not conducive to the growth of chickens. Therefore, it is necessary to add proper single-color lights to the LED white light so as to compensate for the defect. Given the problems above, there is a need for study on the hybrid LED lighting method for chicken coops.

SUMMARY

Technical problems caused by use of unsuitable light sources for artificial light supplementation in chicken coops may include poor health, high death rate and low yield. Implementations of the present disclosure relates to a hybrid LED lighting method and system for chicken coops to improve the production and minimize energy consumption.

In some implementations, yellow LED beads are added to white LED beads in a proper proportion to form a hybrid LED lighting. A suitable number of the hybrid LED lightings are mounted in a chicken coop. When the hybrid LED lightings are lit, the duration is controlled within a proper range and the average light intensity of chicken claws' contact area is controlled within a proper level to improve the digestion and nutrient absorption of chickens. This may reduce the ratio of feed to chicken, increase the weight gain and uniformity of chickens, and improve the health and the resistance to epidemic diseases.

In some implementations, a suitable number of the hybrid LED lightings are mounted in a closed or semi-open chicken coop, wherein the hybrid LED lighting is formed by arranging white LED beads and yellow LED beads in a regularly alternating manner, the mixing ratio of white lamp beads and yellow lamp beads is about 1:5 to about 5:1, and the average light intensity on the underside of chicken cages or floor in the chicken coops exposed to the light of the hybrid LED lighting is about 5 to about 30 Lux. In closed farming mode, chickens are exposed to the light of the hybrid LED lighting for about 10 to about 20 hours every day during fattening period. In semi-open farming mode, chickens are exposed to natural light in the daytime and to the light of the hybrid LED lighting for about 4 to about 10 hours at night during fattening period.

The white LED beads of the hybrid LED lighting are mainly composed by red and blue spectra, and the hybrid LED lighting with red-blue-yellow combined spectrum is formed by mixing white LED beads and yellow LED beads.

The white LED beads and yellow LED beads of the hybrid LED lighting are arranged in a regularly alternating manner into at least one of a ring, straight line, triangle, square, trapezoid or rectangle.

The color temperature, dominant wavelength and peak wavelength of the white LED beads of the hybrid LED lighting are about 6172K, 492.5 nm and 450.5 nm; the color temperature, dominant wavelength and peak wavelength of the yellow LED beads of the hybrid LED lighting are about 1831 K, 588.3 nm and 591.1 nm.

Chickens are exposed to natural light with the help of the window of the chicken coop or by letting the chickens go outside in the daytime during the fattening period of the semi-open farming mode.

Chickens are exposed to the light of the hybrid LED lightings from about 17:00 to about 20:00 at night during the fattening period of the semi-open farming mode.

In some implementations, the chicken coop has windows regularly spaced along the length of both sides, chicken cages are placed about 0.5 to about 1 meter away from and just opposite to each window, the bottom of the chicken cages is about 0 to about 0.5 meter away from the ground, the hybrid LED lighting is mounted about 0.5 to about 2 meters right above the bottom of each chicken cage and parallel to the length of the chicken cage, the hybrid LED lighting is formed by arranging white LED beads and yellow LED beads in a regularly alternating manner. The mixing ratio of the white LED beads and yellow LED beads of the hybrid LED lighting is about 1:5 to about 5:1, and the average light intensity of the underside of chicken cages exposed to the light of the hybrid LED lighting is about 5 to about 30 Lux.

The white LED beads and yellow LED beads of the hybrid LED lighting are arranged in a regularly alternating manner into at least one of a ring, straight line, triangle, square, trapezoid or rectangle.

In some embodiments, the chicken coop has windows regularly spaced along the length of both sides, the hybrid LED lightings are mounted about 1.5 to about 4 meters away from the ground, regularly spaced and along the length of the chicken cage. The hybrid LED lighting is formed by arranging white LED beads and yellow LED beads in a regularly alternating manner, the mixing ratio of the white lamp beads and yellow lamp beads of the hybrid LED lighting is about 1:5 to about 5:1, the distance between two adjacent the hybrid LED lightings is about 1 to about 4 meters, and the average light intensity of the underside of chicken cages exposed to the light of the hybrid LED lighting is about 5 to about 30 Lux.

The white LED beads and yellow LED beads of the hybrid LED lighting are arranged in a regularly alternating manner into at least one of a ring, straight line, triangle, square, trapezoid or rectangle.

Implementations of present disclosure may include the following beneficial effects.

1. The hybrid LED lighting used is based on white LED beads, wherein the white LED beads are cheap, of high luminous efficiency and have red and blue spectrums, while the yellow LED beads added can accelerate the growth of chickens in virtue of the yellow spectrum and therefore are an excellent complement to the white LED beads although expensive and of low luminous efficiency.

2. The red-blue-yellow combined spectrum of the hybrid LED lighting can meet the requirements of both the semi-open production mode and the closed production mode, improve the digestion and nutrient absorption of chickens, increase the weight gain and uniformity of chickens, improve the health and the resistance to epidemic diseases as well as the color of chicken meat, while minimizing energy consumption; besides, repair or replacement expenses and the cost are reduced for the long service life. In addition, white and yellow light do not produce harmful stimuli to eyes and therefore will not cause harm to feeders.

The present disclosure may be applied to the feeding of broiler chickens in large-scale chicken coops.

Figure 1:
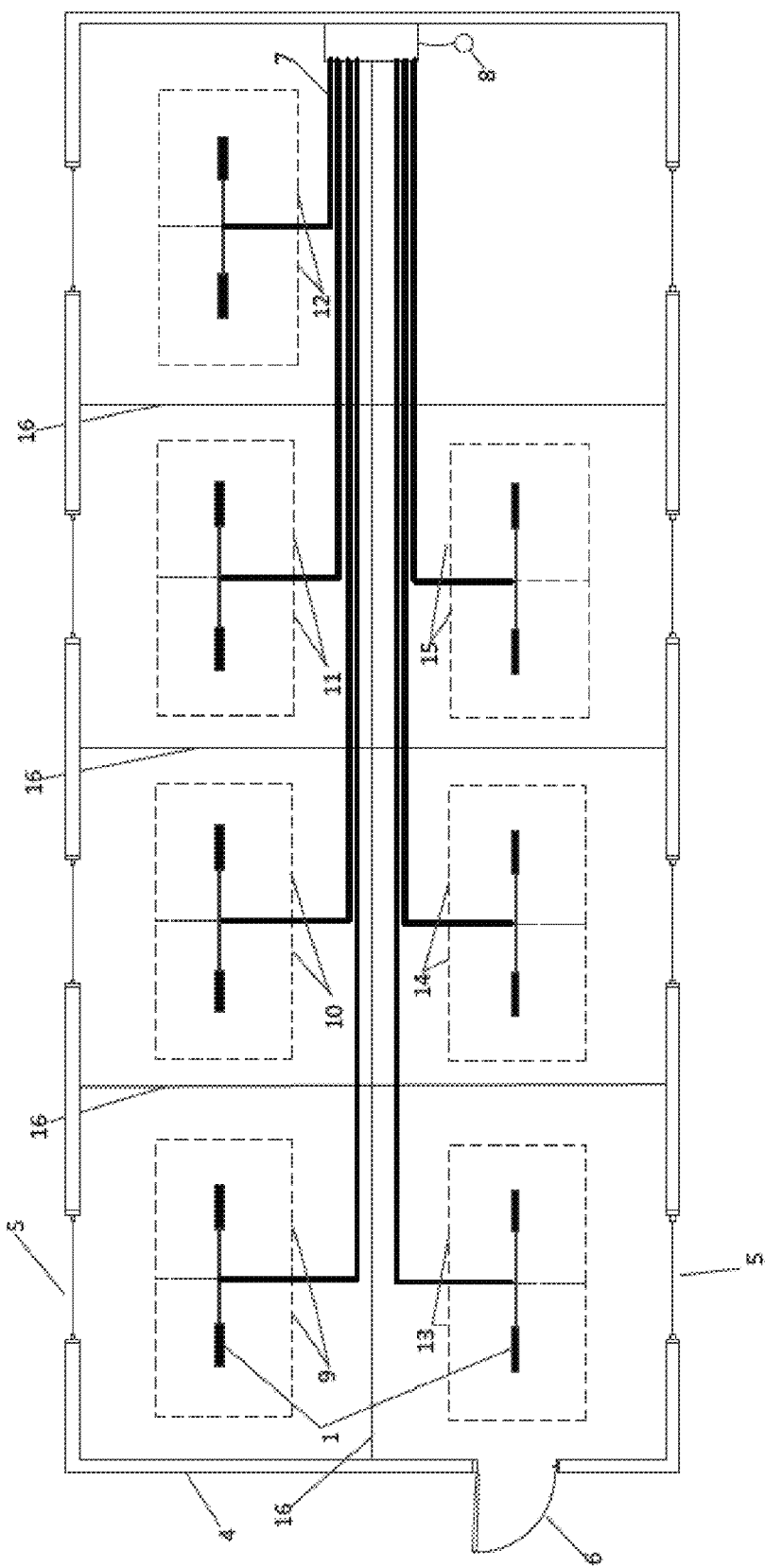
FIG. 1 is a floor plan of a chicken coop in cage farming according to the present disclosure.

Marks and corresponding pieces in the figures are provided as follow: 1: hybrid LED lighting, 2: white LED bead, 3: yellowLED bead, 4: chicken coop, 5: window, 6: door of the chicken coop, 7: wire, 8: switch, 9: Group W6Y0 experimental cage, 10: Group W5Y1 experimental cage, 11: Group W4Y2 experimental cage, 12: Group W3Y3 experimental cage, 13: Group W2Y4 experimental cage, 14: Group W1Y5 experimental cage, 15: Group W0Y6 experimental cage, and 16: shading cloth.

DETAILED DESCRIPTION OF THE PREFERRED EMBODIMENTS

The present disclosure is further detailed by the embodiments in combination with the drawings.

In some implementations, a suitable number of the hybrid LED lightings are mounted in a closed or semi-open chicken coop, wherein the hybrid LED lighting is formed by arranging white LED beads and yellow LED beads in a regularly alternating manner. The mixing ratio of white lamp beads and yellow lamp beads is about 1:5 to about 5:1, and the average light intensity on the underside of chicken cages or floor in the chicken coop exposed to the light of the hybrid LED lighting is about 5 to about 30 Lux. The closed chicken coop is lit by the hybrid LED lighting for about 10 to about 20 h every day during fattening period; the semi-open chicken coop is exposed to natural light in the daytime and lit by the hybrid LED lighting for about 4 to about 10 hours at night during fattening period. The hybrid LED lighting and its average light intensity above are applied to the whole process of the farming in the chicken coop, including brooding period and fattening period. The lighting duration of the hybrid LED lighting is applied to the fattening period of the farming in the chicken coop.

The hybrid LED lighting is formed by adding yellow LED beads to the cheaper white LED beads of high luminous efficiency that are mainly composed by red and blue spectra. Thus the red-blue-yellow compound spectrum formed by mixing white LED beads and yellow LED beads can improve the digestion and nutrient absorption of chickens, increase the weight gain and uniformity of chickens, as well as improve the health and the resistance to epidemic diseases.

The white LED beads and yellow LED beads of the hybrid LED lighting 1 are arranged in a regularly alternating manner into at least one of a ring, straight line, triangle, square, trapezoid or rectangle. As shown in FIG. 5 to FIG. 10 respectively, the white LED beads 2 and yellow LED beads 3 are arranged in a regularly alternating manner into a straight line, ring, square, triangle, trapezoid or rectangle.

The color temperature, dominant wavelength and peak wavelength of the white LED beads of the hybrid LED lighting are about 6172 K, 492.5 nm and 450.5 nm; the color temperature, dominant wavelength and peak wavelength of the yellow LED beads of the hybrid LED lighting are about 1831 K, 588.3 nm and 591.1 nm.

Chickens are exposed to natural light with the help of the window 5 of the chicken coop or by letting the chickens go outside in the daytime during the fattening period of the semi-open farming mode.

Chickens are exposed to the light of the hybrid LED lightings from about 17:00 to about 20:00 at night during the fattening period of the semi-open farming mode.

As shown in FIG. 1, the system according to the present disclosure can be applied to cage farming, comprising: the chicken coop 4 has windows 5 regularly spaced along the length of both sides, chicken cages are placed just opposite to and about 0.5 to about 1 meter away from each window 5, the bottom of the chicken cages is about 0 to about 0.5 meter away from the ground, a the hybrid LED lighting 1 is mounted about 0.5 to about 2 meters right above the bottom of each chicken cage and parallel to the length of the chicken cage, the hybrid LED lighting 1 is formed by arranging white LED beads and yellow LED beads in a regularly alternating manner, the mixing ratio of the white lamp beads and yellow lamp beads of the hybrid LED lighting 1 is about 1:5 to about 5:1. The average light intensity of the underside of chicken cages exposed to the light of the hybrid LED lighting is about 5 to about 30 Lux.

As shown in FIG. 1, seven chicken cages are placed just opposite to and about 0.5 to about 1 meter away from each window 5, and Group W6Y0 experimental chicken cage 9, Group W5Y1 experimental chicken cage 10, Group W4Y2 experimental chicken cage 11, Group W3Y3 experimental chicken cage 12, Group W2Y4 experimental chicken cage 13, Group W1Y5 experimental chicken cage 14 and Group W0Y6 experimental chicken cage 15 are arranged in their corresponding position spaces, spaced with respect to each other.

The white LED beads and yellow LED beads of the hybrid LED lighting 1 are arranged in a regularly alternating manner into at least one of a ring, straight tube, triangle, square, trapezoid or rectangle. As shown in FIG. 5 to FIG. 10 respectively, the white LED beads 2 and yellow LED beads 3 are arranged in a regularly alternating manner into a straight line, ring, square, triangle, trapezoid and rectangle.

The color temperature, dominant wavelength and peak wavelength of the white LED beads of the hybrid LED lighting are about 6172 K, 492.5 nm and 450.5 nm; the color temperature, dominant wavelength and peak wavelength of the yellow LED beads of the hybrid LED lighting are about 1831 K, 588.3 nm and 591.1 nm.

Figure 2:
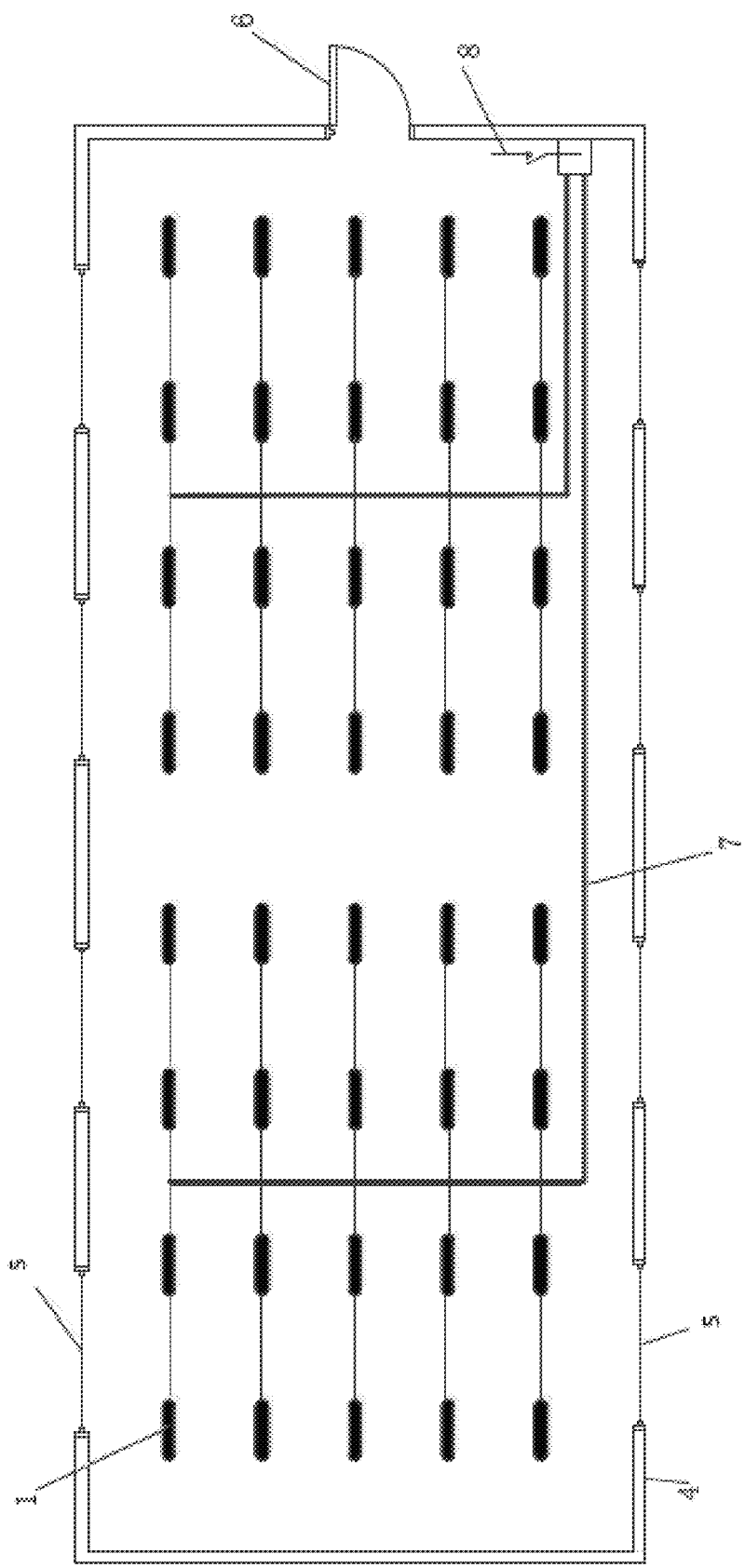
FIG. 2 is a floor plan of a chicken coop in floor farming according to the present disclosure.

As shown in FIG. 2, the system according to the present disclosure can be applied to floor farming, comprising: the chicken coop 4 has windows 5 regularly spaced along the length of both sides, the hybrid LED lightings 1 are mounted about 1.5 to about 4 meters away from the ground, regularly spaced and along the length of the chicken cage 4, the hybrid LED lighting 1 is formed by arranging white LED beads and yellow LED beads in a regularly alternating manner, the mixing ratio of the white lamp beads and yellow lamp beads of the hybrid LED lighting 1 is about 1:5 to about 5:1, the distance between two adjacent the hybrid LED lightings 1 is 1 to 4 meters, and the average light intensity of the underside of chicken cages exposed to the light of the hybrid LED lighting is about 5 to about 30 Lux.

The white LED beads and yellow LED beads of the hybrid LED lighting 1 are arranged in a regularly alternating manner into at least one of a ring, straight tube, triangle, square, trapezoid or rectangle. As shown in FIG. 5 to FIG. 10 respectively, the white lamp beads 2 and yellow lamp beads 3 are arranged in a regularly alternating manner into a straight line, ring, square, triangle, trapezoid and rectangle.

The color temperature, dominant wavelength and peak wavelength of the white LED beads of the hybrid LED lighting are about 6172 K, 492.5 nm and 450.5 nm; the color temperature, dominant wavelength and peak wavelength of the yellow LED beads of the hybrid LED lighting are about 1831 K, 588.3 nm and 591.1 nm.

The turning on/off of the hybrid LED lightings is controlled by a manual switch, an automatic timer or controller. One or more lines of the hybrid LED lightings 1 are taken as a control circuit which is connected to the switch 8 with the wire 7. The chicken coop 4 has a door 6.

Embodiment 1

Figure 3:
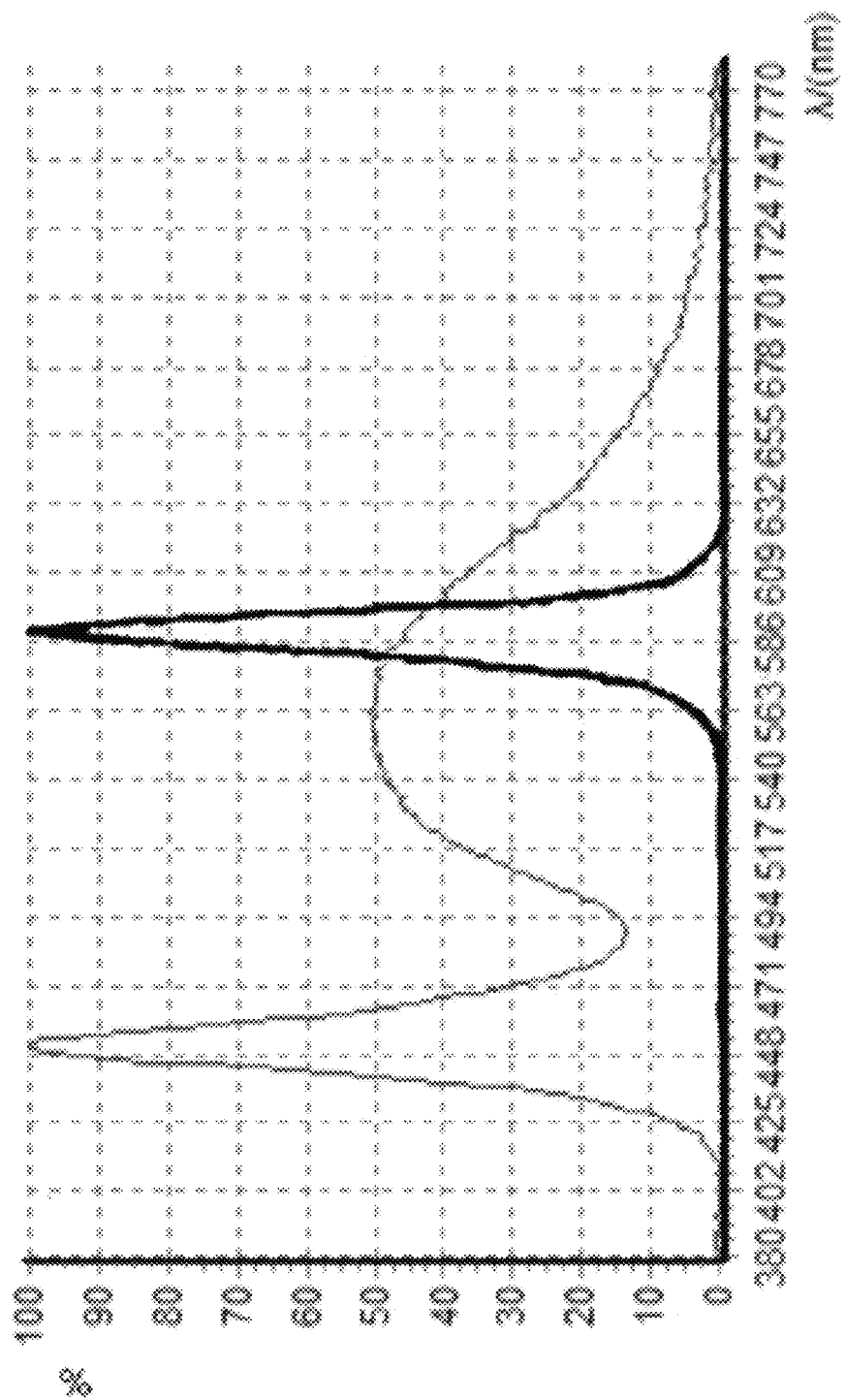
FIG. 3 is a spectrogram of the hybrid LED lighting according to implementations of the present disclosure.
Figure 4:
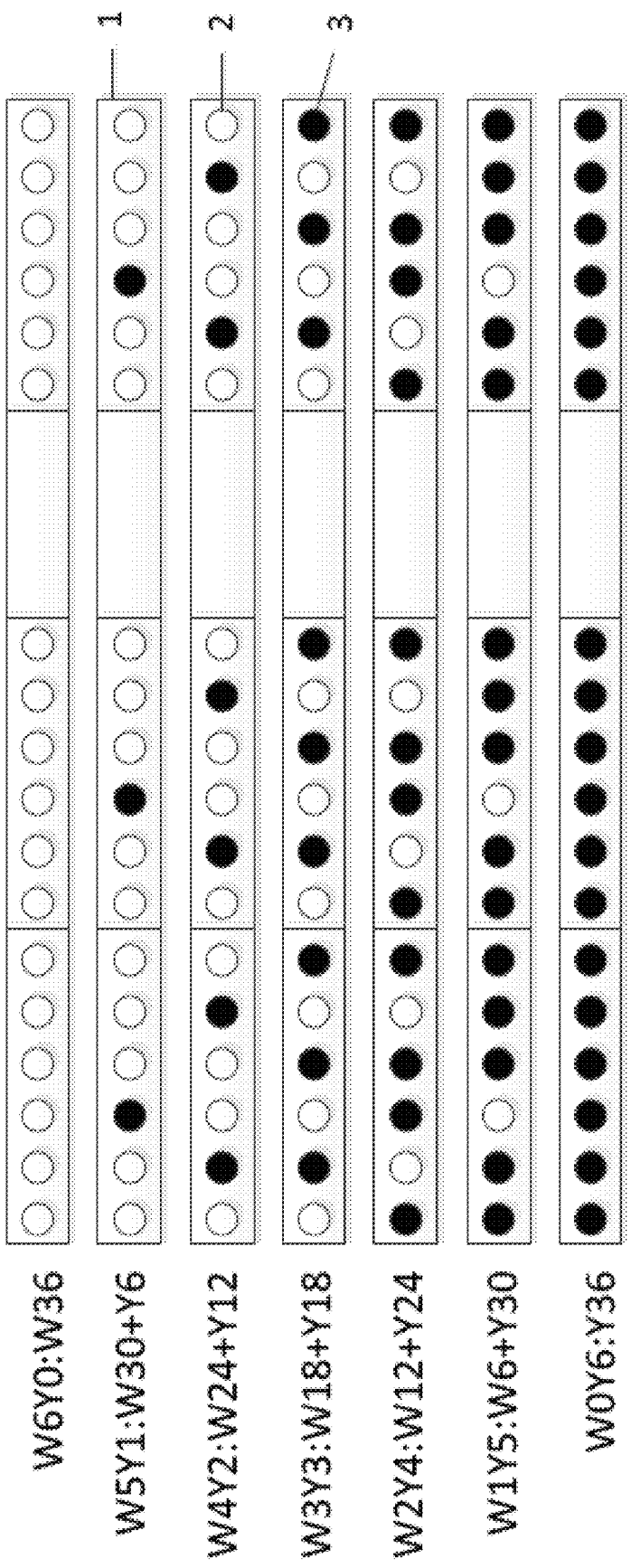
FIG. 4 illustrates the arrangement of the beads of the hybrid LED lighting according to implementations of the present disclosure.
Figure 5:
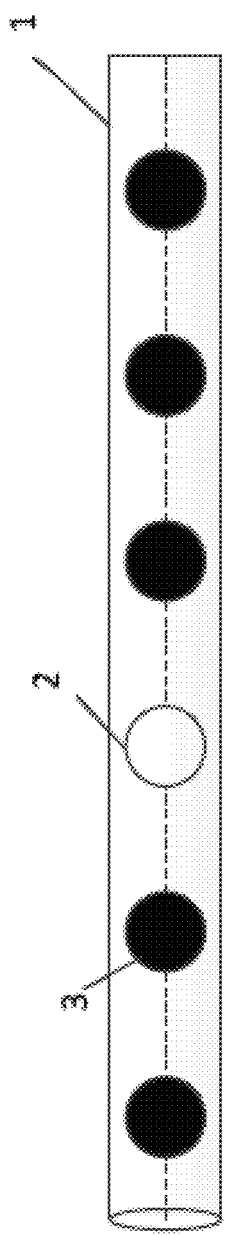
FIG. 5 illustrates the straight-line arrangement of the beads of the hybrid LED lighting of the present disclosure.
Figure 6:
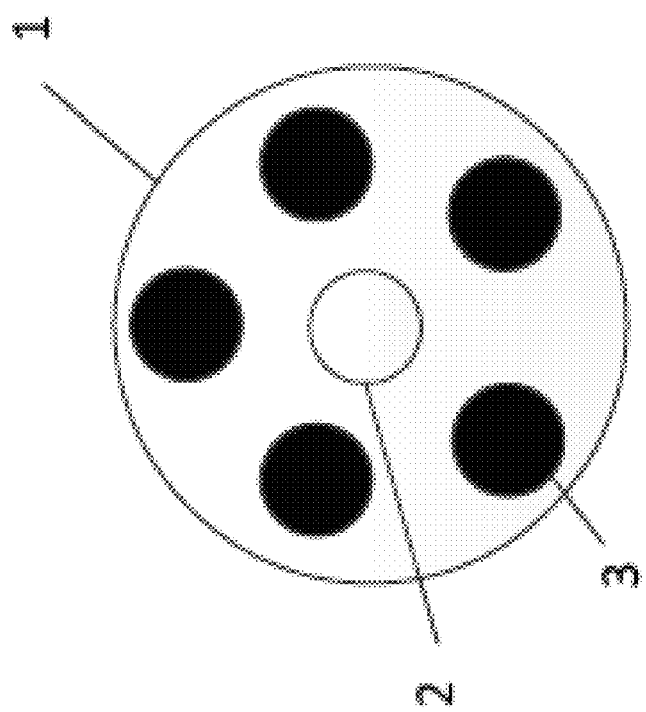
FIG. 6 illustrates the ring-shaped arrangement of the beads of the hybrid LED lighting of the present disclosure.
Figure 7:
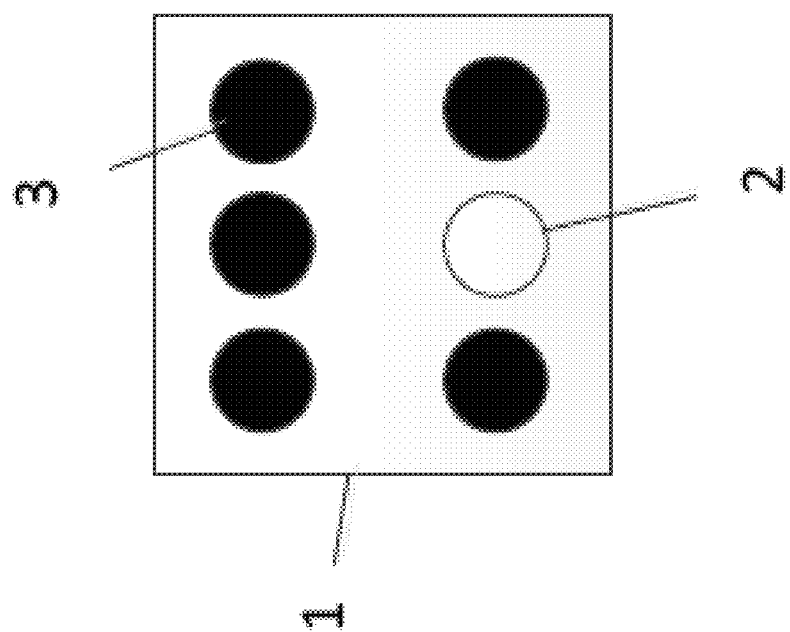
FIG. 7 illustrates the square arrangement of the beads of the hybrid LED lighting of the present disclosure.
Figure 8:
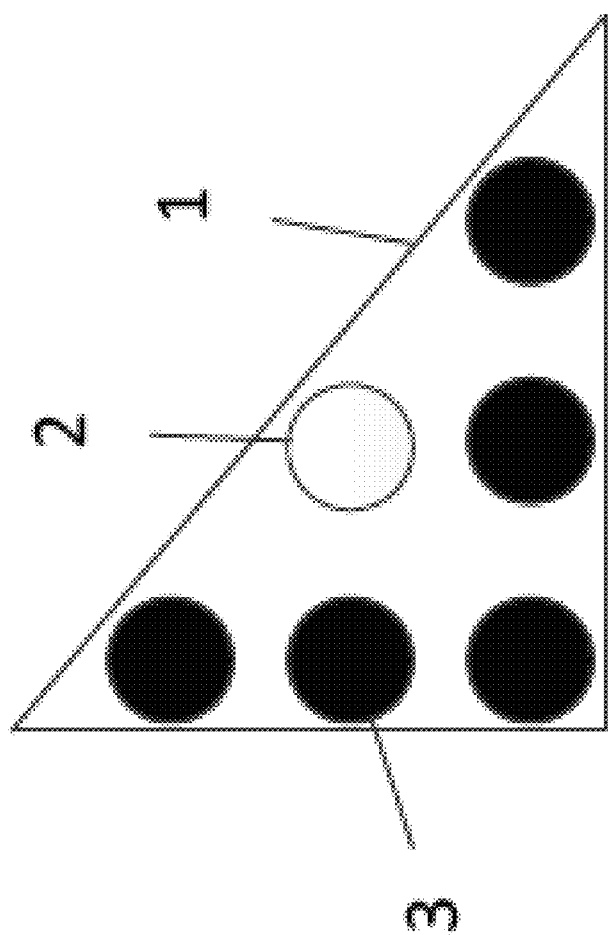
FIG. 8 illustrates the triangular arrangement of the beads of the hybrid LED lighting of the present disclosure.
Figure 9:
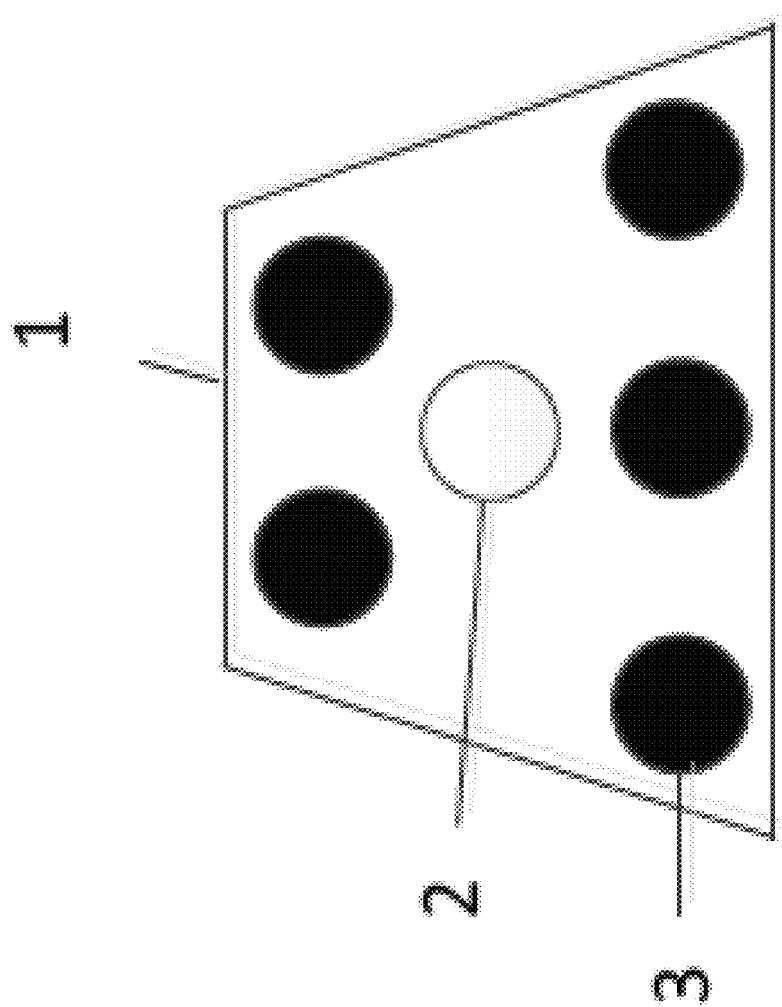
FIG. 9 illustrates the trapezoidal arrangement of the beads of the hybrid LED lighting of the present disclosure.
Figure 10:
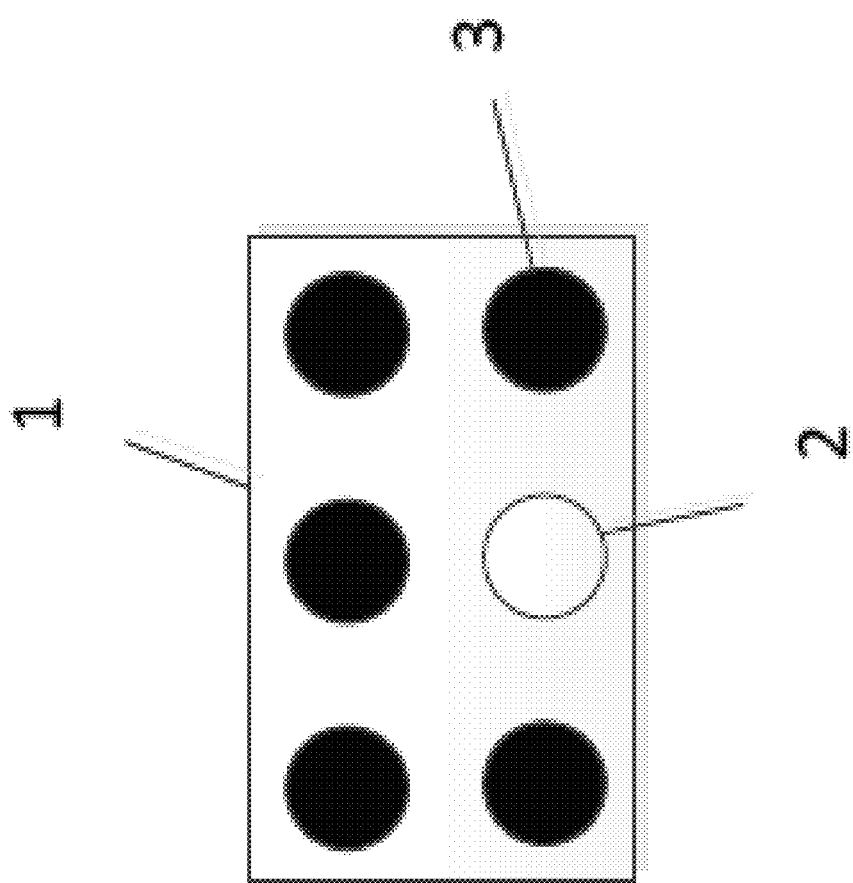
FIG. 10 illustrates the rectangular arrangement of the beads of the hybrid LED lighting of the present disclosure.

To obtain an optimum mixing ratio of white to yellow LED beads, seven experimental groups (W6Y0, W5Y1, W4Y2, W3Y3, W2Y4, W1Y5, W0Y6) are set in the experiment (digits indicate the ratio of white to yellow lamp beads' number), the spectrograms of the white and yellow LED beads is as shown in FIG. 3; all LED beads are the white LED bead in Group W6Y0, i.e. the number of white LED beads is 36; the ratio of white LED beads to yellow LED beads in Group W5Y1 is about 5:1, i.e. 30 white LED beads and 6 yellow LED beads; the ratio of white LED beads to yellow LED beads in Group W4Y2 is about 4:2, i.e. 24 white LED beads and 12 yellow LED beads; the ratio of white LED beads to yellow LED beads in Group W3Y3 is about 3:3, i.e. 18 white LED beads and 18 yellow LED beads; the ratio of white LED beads to yellow LED beads in Group W2Y4 is about 2:4, i.e. 12 white LED beads and 24 yellow LED beads; the ratio of white LED beads to yellow LED beads in Group W1Y5 is about 1:5, i.e. 6 white LED beads and 30 yellow LED beads; the LED beads used in Group W0Y6 are all yellow, i.e. the number of yellow LED beads is 36; the specific arrangement of the LED beads is as shown in FIG. 4.

210 1-day-old "plum blossom-yellow" hens are divided at random into seven experimental groups, i.e. W6Y0, W5Y1, W4Y2, W3Y3, W2Y4, W1Y5 and W0Y6 (30 hens in each group) for 14-day breeding, the chicken cages used for breeding is a cube-shaped iron net-type chicken cage 1 meter in length, width and height, the chicken cages are 30 cm above the ground and separated from each other with a shading cloth to avoid mutual interference among groups. The temperature in the brooding house is strictly controlled by air heaters, and the humidity is controlled by humidifiers.

During the breeding period, totally-closed farming is adopted, i.e. chickens are exposed to the light of the hybrid LED lighting. To stimulate 1 to 3-day-old chicks to learn drinking and eating, the light intensity is controlled at about 30 Lux and the lighting duration is set to be about 24 h; for over 3-day-old chickens, the light intensity is controlled at about 15 Lux, the lighting duration is decreased by 1 h every day and finally kept at a photoperiod of 18L:6D till the end of the 14-day breeding period. During the breeding period, there are no limitations on the addition of feed and water, and broiler chickens can feed freely.

At the end of the breeding period, i.e. chickens are about 15 days old, weigh the chickens in each experimental group one by one, cull thin, weak, sick and deformed ones and misjudged cocks, pick out 20 health hens uniform in size and weight, divide them into two parallel groups at random and put them in the corresponding color-mixing cages in the fattening chicken coop. The arrangement of the experimental field of the fattening chicken coop is as shown in FIG. 1, the chicken coop 4 is 15.5 meters long, with 4 windows 5 each 1.5 meters in length. 1 meter away from each window are placed with two 1 m×1 m chicken cages, two chicken cages at the same window 5 are taken as one group, the two chicken cages in the same group are set against each other and just opposite to the window, and adjacent groups are separated from each other with a shading cloth 16. Seven chicken cages, Group W6Y0 experimental chicken cage 9, Group W5Y1 experimental chicken cage 10, Group W4Y2 experimental chicken cage 11, Group W3Y3 experimental chicken cage 12, Group W2Y4 experimental chicken cage 13, Group W1Y5 experimental chicken cage 14 and Group W0Y6 experimental chicken cage 15 are arranged in their corresponding position spaces, spaced with respect to each other. The bottom of the chicken cages is about 0.5 meter above the ground, about 1.5 meters right above the bottom of each chicken cage is mounted with one the hybrid LED lighting 1 which is a LED lamp 0.6 meter in length, each the hybrid LED lighting 1 has 36 LED beads, the two hybrid LED lightings in one group are controlled by one circuit, the four control circuits are connected to the switch 8 with the wire 7, and 6 is the door of the chicken coop.

Figure 11:
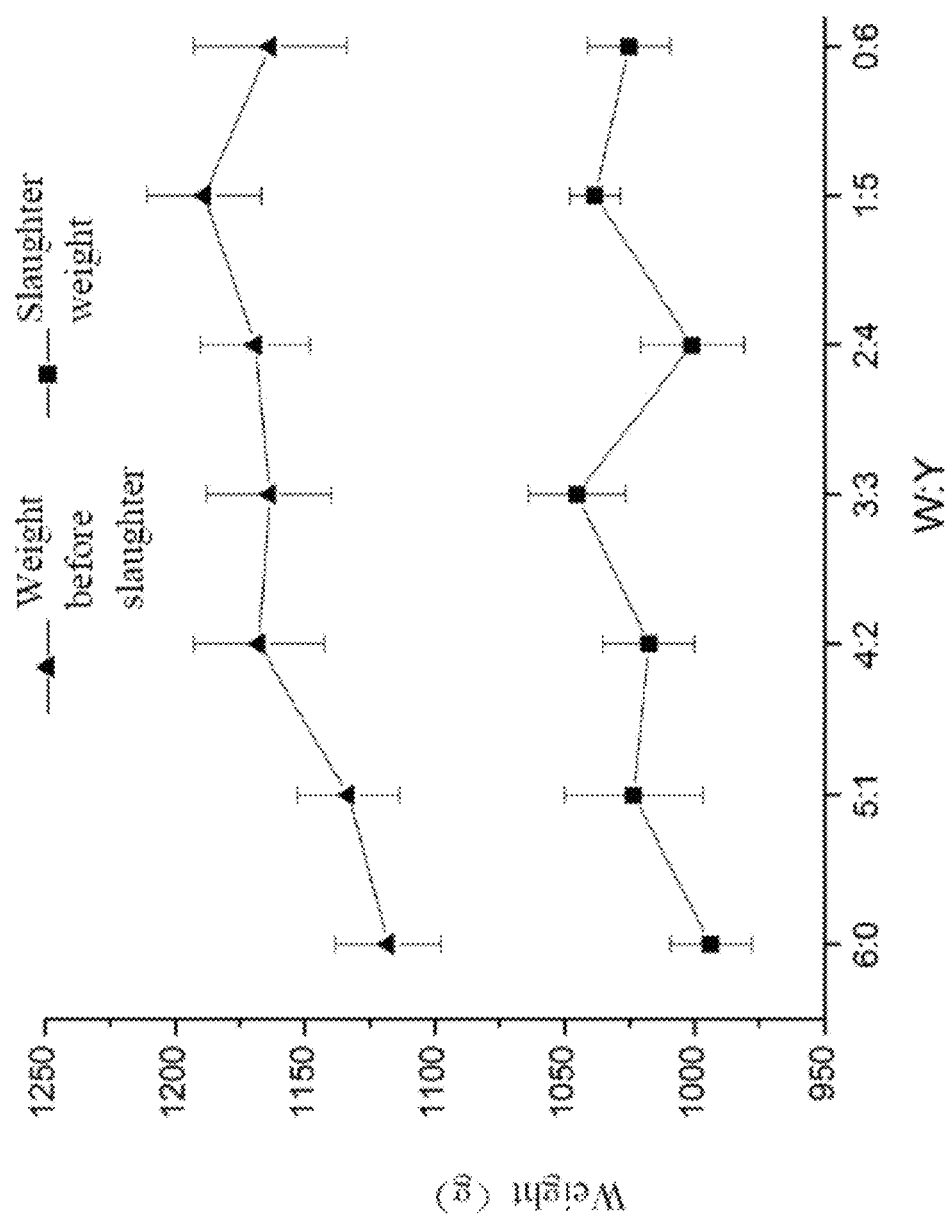
FIG. 11 is a comparison diagram between the weight before slaughter and the slaughter weight of the experimental groups of Embodiment I of the present disclosure.

Semi-open farming is used during the fattening period, i.e., chickens are exposed to natural light with the help of windows in the daytime and to the light of the hybrid LED lightings at night, wherein the hybrid LED lighting is turned on at about 18:00 and turned off at about 2:00 am of the next day, the lighting duration at night is about 8 h, and the average light intensity of the underside of the chicken cages is about 15 Lux. During the fattening period, record the feed consumption and death of each experimental group regularly every day, weigh the chickens in each experimental group every two weeks, and calculate the ratio of feed to chicken, the weight gain and uniformity of chickens till the end of 80 days when chickens are taken out of the cages. Chickens are not allowed to have food for about 12 h before taking out of the cages. Weigh the chickens at the end of 12 h, slaughter them after weighing, weigh the dead chickens to obtain the slaughter weight, dissect each chicken and weigh the functional entrails (such as the heart and the liver), skinned legs and claws, and measure the pH value. The comparison diagram between the weight before slaughter and the slaughter weight is as shown in FIG. 11, the comparison of growth performance indicators is given in Table 1, the comparison of slaughter performance is given in Table 2 and Table 2 (continued), wherein the ratio of feed to chicken=feed consumption/weight gain, uniformity=1-standard deviation of weight/mean value of weight, the cost of yellow lamp beads is calculated according to RMB 0.25 Yuan/bead, the cost of white lamp beads is calculated according to RMB 0.2 Yuan/bead, the cost of feed is calculated according to RMB 3.5 Yuan/kg, the electricity is RMB 0.53 Yuan/kilowatt-hour, earning from sale is calculated according to that chickens are sold at 25/kg, and gross profit=earnings from sale-cost of feed-electricity charge-cost of lamp beads.

TABLE 1

Comparison of Growth Performance Indicators

| Indicators | Groups | | | | | | |
|---|---|---|---|---|---|---|---|
| | W6Y0 | W5Y1 | W4Y2 | W3Y3 | W2Y4 | W1Y5 | W0Y6 |
| Weight gain | 1077.96 | 1093.25 | 1127.74 | 1123.54 | 1129.05 | 1148.75 | 1123.37 |
| Ratio of feed to chicken | 2.066 | 1.876 | 2.198 | 2.190 | 2.054 | 2.116 | 2.096 |
| Uniformity | 0.923 | 0.907 | 0.905 | 0.918 | 0.919 | 0.918 | 0.906 |

According to Table 1, it can be obtained that the weight gain of the five groups W:Y is about 1:5 to about 5:1 is greater than that of Group W6Y0, the weight gain of the five groups W:Y is about 1:5 to about 4:2 is greater than that of Group W0Y6; the weight gain of Group W5Y1 is less than that of Group W0Y6, but since the power of yellow LED beads is greater than that of white LED beads when both are the same light intensity, the electricity consumption of Group W0Y6 is far greater than that of Group W5Y1 at the same light intensity and lighting duration during the whole growth cycle which is contrary to the expectation of minimizing energy consumption; when W:Y is about 5:1, the ratio of feed to chicken is the lowest; it can be seen from FIG. 11 that the weight before slaughter is the largest when W:Y is about 1:5, the slaughter weight is the greatest when W:Y is about 3:3 and the second greatest slaughter weight is W:Y about 1:5; considering by combing with Table 1 and FIG. 11, although the weight gain of Group W0Y6 is greater than that of Group W5Y1 and the slaughter weight of Group W0Y6 is greater than those of Groups W5Y1, W3Y3, etc., its energy saving effects are worse and therefore the economic benefits are lower with respect to other groups. From the analysis above, the ratio of white to yellow lamp beads (W:Y=about 1:5 to about 5:1) is more conducive to the growth of yellow-feather chickens.

TABLE 2

Comparison of Slaughter Indicators

| Slaughter indicators | Groups | | | |
|---|---|---|---|---|
| | W6Y0 | W5Y1 | W4Y2 | W3Y3 |
| Slaughter weight | 993.77 ± 15.75[ab] | 1023.5 ± 26.69[a] | 1017.6 ± 17.59[a] | 1045.2 ± 18.78[a] |
| Slaughter percentage | 87.10 ± 0.48 | 88.59 ± 2.11 | 86.61 ± 1.46 | 87.22 ± 0.80 |

TABLE 2-continued

Comparison of Slaughter Indicators

| | | | | |
|---|---|---|---|---|
| Comb height | 11.06 ± 1.17$^b$ | 10.45 ± 0.90$^b$ | 11.90 ± 0.31$^b$ | 11.93 ± 1.25$^b$ |
| Comb thickness | 3.04 ± 0.19 | 2.73 ± 0.23 | 2.90 ± 0.17 | 3.19 ± 0.36 |
| Heart | 3.70 ± 0.19$^{ab}$ | 3.98 ± 0.24$^a$ | 3.57 ± 0.20$^{ab}$ | 3.85 ± 0.17$^{ab}$ |
| Liver | 20.15 ± 1.20$^a$ | 20.75 ± 0.40$^{ab}$ | 20.71 ± 1.12$^{ab}$ | 21.50 ± 0.64$^{ab}$ |
| Stomach | 18.70 ± 1.15$^{ab}$ | 21.95 ± 1.36$^{ab}$ | 17.91 ± 1.50$^a$ | 21.97 ± 1.93$^{ab}$ |
| Leg weight | 205.59 ± 6.09 | 209.52 ± 8.01 | 210.06 ± 4.07 | 217.17 ± 13.78 |
| Claw weight | 38.66 ± 2.05 | 40.01 ± 1.75 | 40.56 ± 1.25 | 39.91 ± 2.09 |
| pH | 5.71 ± 0.06$^b$ | 5.63 ± 0.05$^{ab}$ | 5.54 ± 0.03$^a$ | 5.72 ± 0.05$^b$ |

| | Groups | | |
|---|---|---|---|
| Slaughter indicators | W2Y4 | W1Y5 | W0Y6 |
| Slaughter weight | 1001.0 ± 19.92$^{ab}$ | 1038.3 ± 9.70$^a$ | 1025.3 ± 15.75$^a$ |
| Slaughter percentage | 85.81 ± 1.53 | 87.24 ± 0.13 | 86.68 ± 0.33 |
| Comb height | 12.69 ± 1.12$^b$ | 12.70 ± 0.46$^b$ | 16.04 ± 2.04$^a$ |
| Comb thickness | 3.28 ± 0.31 | 3.20 ± 0.28 | 3.74 ± 0.68 |
| Heart | 3.49 ± 0.10$^{ab}$ | 3.86 ± 0.32$^{ab}$ | 3.74 ± 0.21$^{ab}$ |
| Liver | 23.81 ± 1.60$^b$ | 21.93 ± 0.94$^{ab}$ | 19.68 ± 0.78$^a$ |
| Stomach | 19.25 ± 0.85$^{ab}$ | 19.06 ± 1.28$^{ab}$ | 19.56 ± 1.57$^{ab}$ |
| Leg weight | 203.66 ± 7.05 | 213.01 ± 5.90 | 209.13 ± 6.52 |
| Claw weight | 37.93 ± 1.59 | 41.04 ± 2.64 | 40.09 ± 1.78 |
| pH | 5.69 ± 0.08$^{ab}$ | 5.73 ± 0.04$^b$ | 5.65 ± 0.06$^{ab}$ | v It can be seen from Table 2 and Table 2 (continued) that the comb height of Group W0Y6 is significantly greater than that of Groups W5Y1(P=0.001), W4Y2 (P=0.013), W3Y3 (P=0.013), W2Y4(P=0.041), W1Y5(P=0.041) and W6Y0 (P=0.003), and the comb thickness of Group W0Y6 is also greater than that of the other groups, which indicates that yellow light can significantly accelerate the sexual maturation of hens; Group W3Y3 has the greatest slaughter weight and Group W1Y5 has the second greatest slaughter weight, although Group W5Y1 has the greatest slaughter percentage, Group W1Y5 still takes the second place, so considering by combining the slaughter weight and the slaughter percentage, the effect of the combination of the lamp beads in Group W1Y5 is better than that in other groups; Group W5Y1 has the greatest heart weight while Group W1Y5 has the second greatest heart weight; Group W1Y5 has the greatest claw weight and is second to Group W3Y3 in leg weight, which indicates that the combination of the lamp beads in Group W1Y5 is more conducive to accelerates the growth of chickens' legs and reduce the possibility of leg diseases with respect to other combinations; the pH value of the breast in all the groups is less than 7 and therefore acidic, wherein the pH value of Group W1Y5 is near neutrality with respect to the other groups and significantly greater than that of Group W4Y2. From the analysis of the indicators above, the combination of the lamp beads in Group W1Y5 is better than that in other groups, more conducive to the growth of "plum blossom-yellow" hens. It can be seen from the final result of Embodiment 1 that use of the hybrid LED lightings with the ratio of white to yellow lamp beads of about 1:5 to about 5:1 is more conducive to improve the digestion and nutrient absorption of chickens, increase the weight gain and uniformity of chickens, as well as improve the health and the resistance to epidemic diseases than the pure white lamps in Group W6Y0, and reduce the cost of lamps and electricity consumption and generate more economic benefits than the pure yellow lamps in Group W0Y6.

Embodiment 2

Closed farming is used for the brooding period of 3000 yellow-feather chickens, i.e. the chickens are exposed to the light of the hybrid LED lighting 1 only, the hybrid LED lightings 1 with a about 0.6 m long tube have white LED beads and yellow LED beads regularly arranged in a ratio of about 1:5, i.e. 6 white LED beads and 30 yellow LED beads, wherein the color temperature, dominant wavelength and peak wavelength of the white LED beads are about 6172 K, 492.5 nm and 450.5 nm, the color temperature, dominant wavelength and peak wavelength of the yellow LED beads are about 1831 K, 588.3 nm and 591.1 nm, and the spectrograms of white LED beads and yellow LED beads are as shown in FIG. 3; to stimulate 1 to 3-day-old chicks to learn drinking and eating, the light intensity is controlled at about 30 Lux and the lighting duration is set to be about 24 h; for over 3-day-old chickens, the light intensity is controlled at about 15 Lux, the lighting duration is decreased by about 1 h every day and finally kept at a photoperiod of 18L:6D till the end of the 14-day brooding period. During the breeding period, there are no limitations on the addition of feed and water, and broiler chickens can feed freely.

At the end of 14 days, 200 weak and unhealthy chickens are culled, 2800 chickens remain and are put in the chicken coop 4 for fattening. Closed farming and floor farming are used during the fattening period. As shown in FIG. 2, a shading cloth 16 is fit to each window 5 of a farming chicken coop to exclude natural light but it shall not affect the entry of the air into the house; the chicken coop 4 is 20.8 meters long, 12 meters wide and has 8 windows 5 2.6 meters in length; 48 the hybrid LED lightings 1 are provided, 1 m away from the wall and spaced out about 2 m apart; the average light intensity away from the ground is about 15 Lux, the lamps are turned on at about 20:00 and turned off at about 24:00, and the duration when the hybrid LED lightings are lit is about 4 h; two adjacent lines of the hybrid LED lightings 1 are taken as one control circuit which is connected to the controller 8 with the wire 7, the switch of the hybrid LED lightings are controlled by the switch 8, and 6 is the door of the chicken coop. During the fattening period, record the feed consumption and death of each experimental group regularly every day, weigh the chickens in each experimental group every two weeks, and calculate the ratio of feed to chicken, the weight gain and uniformity of chickens till the end of 80 days when chickens are taken out of the cages. The combination of white LED beads and yellow LED beads in the proportion of about 1:5 and the lighting in the embodiment are more conducive to improve the digestion and nutrient absorption of chickens, increase the weight gain and uniformity of chickens, as well as improve the health and the resistance to epidemic diseases.

Embodiment 3

A single 120 meters long and 13.9 wide closed chicken coop of a white-feather broiler chicken breeding farm is used for totally-closed net farming. The hybrid LED lighting with a 0.6 m long tube is mounted along the length of the chicken coop, and taking the feeding trough line and the water line as the reference, there are 7 lines of lamps and 207 lamps in total; two adjacent lines of LED lamps are spaced out 1.8 m apart, two adjacent LED lamps in the same line are spaced out 4 m apart, tubes of two adjacent lines of LED lamps are mounted in an alternating manner; one common control circuit is provided every seven the hybrid LED lightings along the width of the chicken coop, one common controller is provided every five control circuits which are connected to the controller with wires. The hybrid LED lightings have white LED beads and yellow LED beads arranged in a ratio of about 3:14, wherein the color temperature, dominant wavelength and peak wavelength of the white LED beads are about 6172 K, 492.5 nm and 450.5 nm; the color temperature, dominant wavelength and peak wavelength of the yellow LED beads are about 1831 K, 588.3 nm and 591.1 nm. To stimulate 1 to 3-day-old chicks in the brooding period to learn drinking and eating, the light intensity is controlled at 30 Lux and the lighting duration is set to be 24 h; to stimulate 4 to 7-day-old chickens to feed more, the light intensity is controlled at 15 Lux and the lighting duration is set to be 20 h; the fattening period starts from the eighth day, the light intensity is controlled at about 15 Lux and the lighting duration is set to be 20 h for 8 to 40-day-old chickens in the fattening period; the lamps in the breeding house are turned off after 21:00. The light intensity, lighting duration, turning-on and turning-off of the hybrid LED lightings are controlled by the controller.

Except the light source, all farming procedures of the LED lighting chicken coop are kept the same as those of the chicken coops using other energy-saving lamps for lighting. At the end of the experiment, make a comparison between the LED lighting chicken coop and the other two chicken coops using other energy-saving lamps for lighting.

Figure 12:
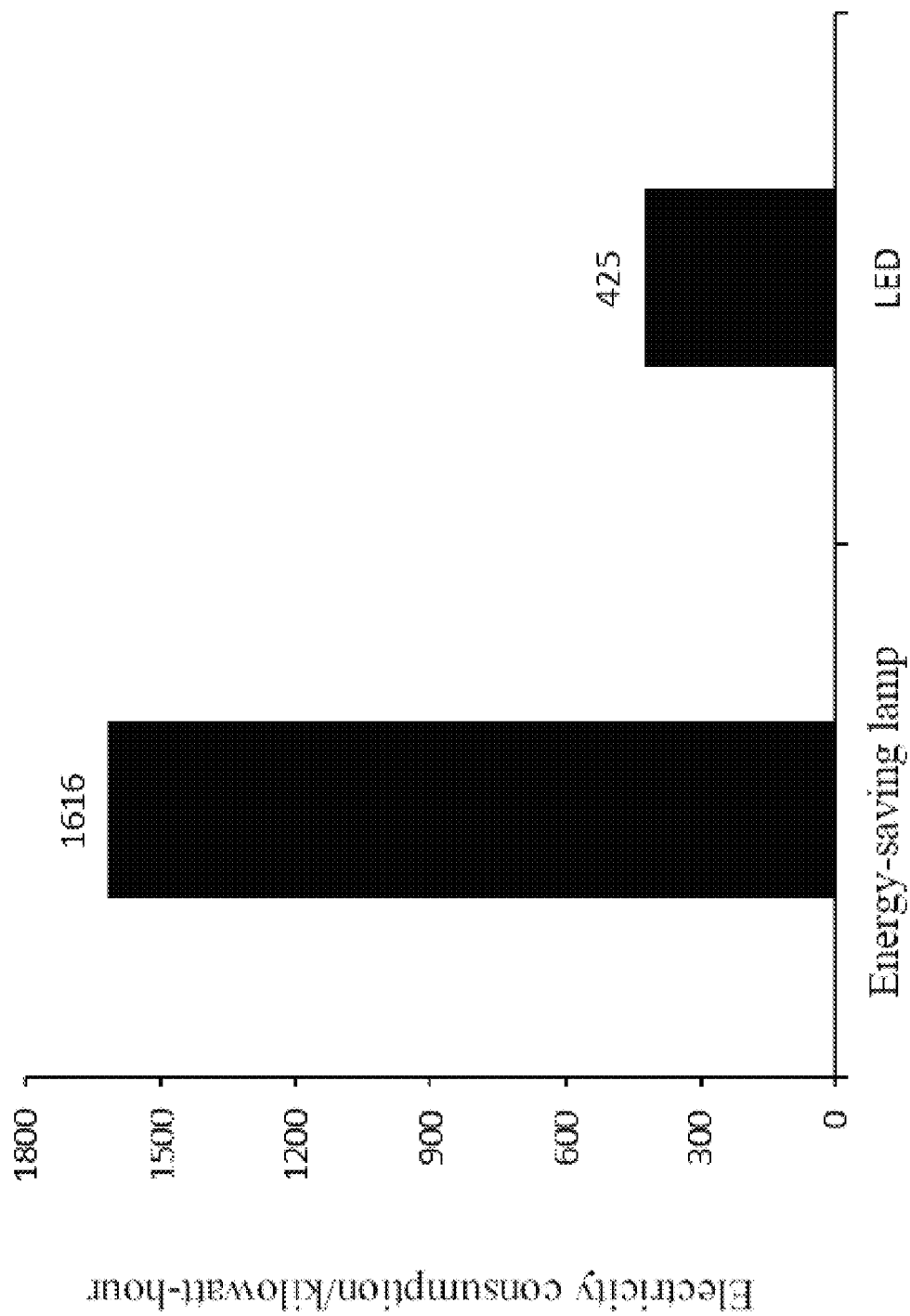
FIG. 12 is a comparison chart between a chicken coop with common energy-saving lamps and a chicken coop with LED lamps of Embodiment 3 of the present disclosure.
Figure 13:
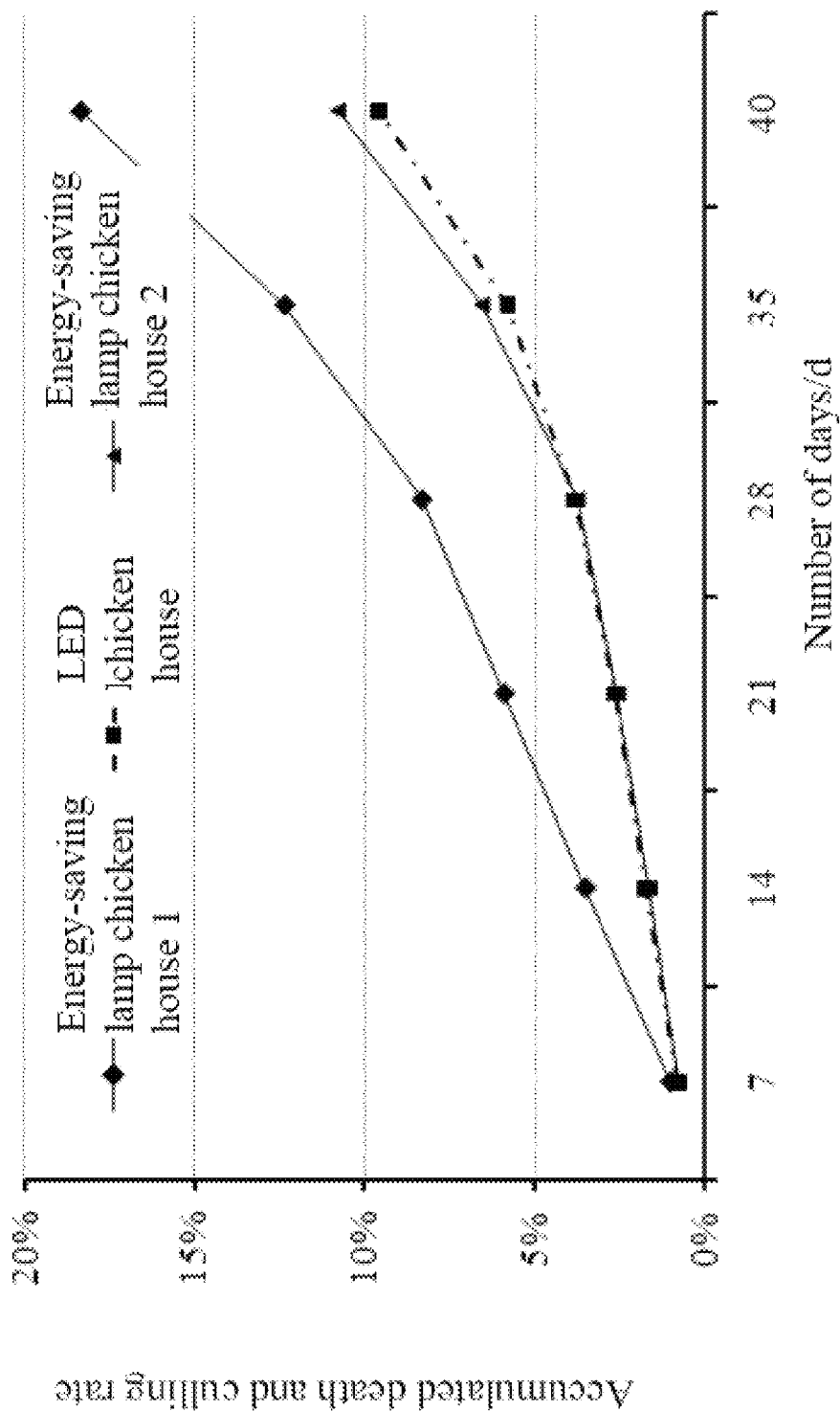
FIG. 13 is the death and culling rate of each chicken coop of Embodiment 3 of the present disclosure.

It can be seen from FIG. 12 that the LED lighting chicken coop consumes much less electricity than those using common energy-saving lamps, and electricity consumption is reduced by 1191 kilowatt-hour in breeding one batch of chickens, saving 73.7% of electricity. Comparing the death and culling rate of the LED lamp chicken coop and the chicken coops using other energy-saving lamps in the breeding in FIG. 13, the death and culling rate of the LED lamp chicken coop is found always lower than that of the two chicken coops using other energy-saving lamps. Wherein, the accumulated death and culling rate of the LED lamp chicken coop is 8.89%, the accumulated death and culling rate of the chicken coops 1 using energy-saving lamps is 18.40%, the accumulated death and culling rate of the chicken coops 2 using energy-saving lamps is 10.18%, and the death and culling rate of the LED lamp chicken coop is lower than that of the chicken coops using energy-saving lamps by 5.4% on average.

It can be seen from the final result of Embodiment 3 that the accumulated death and culling rate of the broiler chickens exposed to the light of the hybrid LED lightings is lower than that of the broiler chickens exposed to the light of common energy-saving lamps, which indicates used of the hybrid LED lighting can improve the health and the resistance of chickens to epidemic diseases, substantially reduce electricity consumption and generate more economic benefits.

The embodiments above are for describing the present disclosure and not intended to limit the present disclosure. And modification and changes can be made to the present disclosure without deviating from the spirit and protection scope claimed in the claims, and these modifications and changes are covered by the protection scope of the present disclosure.

What is claimed is:

1. A method for lighting a chicken coop, the method comprising: arranging white beads and yellow beads in a predetermined alternating manner to form a plurality of hybrid LED lightings, an individual hybrid LED lighting of the plurality of hybrid LED lightings comprising one or more white beads and one or more yellow beads, the plurality of hybrid LED lightings mounted in a closed or semi-open chicken coop, a ratio of the one or more white beads and the one or more yellow beads in the individual hybrid LED lighting ranging from 0.2 to 5 is 0.2an average light intensity of the plurality of hybrid LED lightings on underside of chicken cages or a floor associated with the closed or semi-open chicken coop ranging from about 5 to about 30 Lux;

in response to a determination of a closed farming mode, exposing chickens to light of the plurality of hybrid LED lightings for about 10 to 20 hours per day during a fattening period in the closed or semi-open chicken coop; and In response to a determination of a semi-open farming mode, exposing the chickens to natural light in a daytime and to the light of the plurality of hybrid LED lightings for about 4 to 10 hours at a night during the fattening period in the closed or semi-open chicken coop, wherein, after the chickens are fed for a predetermined time period, a weight gain of the chickens exposed to the plurality of hybrid LED lightings is greater than a weight gain of chickens exposed to a plurality of only white LED lightings or a plurality of only yellow LED lightings.

2. The method of claim 1, wherein the white beads of the plurality of hybrid LED lighting are associated with red and blue spectra, and the plurality of hybrid LED lightings are associated with red-blue-yellow combined spectrum.

3. The method of claim 1, wherein the white beads and yellow beads of the plurality of hybrid LED lighting are arranged in a regularly alternating manner into at least one of a ring, straight line, triangle, square, trapezoid or rectangle.

4. The method of claim 1, wherein a color temperature, a dominant wavelength and a peak wavelength of the white beads of the plurality of hybrid LED lighting are about 6172 K, 492.5 nm and 450.5 nm, respectively, and wherein a color temperature, a dominant wavelength and a peak wavelength of the yellow beads of the plurality of hybrid LED lighting are about 1831 K, 588.3 nm and 591.1 nm, respectively.

5. The method of claim 1, further comprising:

letting a window of the closed or semi-open chicken coop open such that the chickens are exposed to natural light from the window of the chicken coop, or letting the chickens go outside in the daytime during the fattening period in the semi-open farming mode.

6. The method of claim 1, wherein the chickens were exposed to the light of the plurality of hybrid LED lightings from about 17:00 to about 20:00 at the night during the fattening period in the semi-open farming mode.

7. A hybrid LED lighting system comprising:
- a plurality of windows arranged along two sides of a chicken coop comprising a plurality of chicken cages, an individual chicken cage placed about 0.5 to about 1 meter away from another individual chicken cage, the individual chicken cage being opposite to a window of the plurality of windows, a bottom of the individual chicken cage being about 0 to about 0.5 meter away from ground of the chicken coop;
- a plurality of hybrid LED lightings, an individual hybrid LED light mounted about 0.5 to about 2 meter above a bottom of the individual chicken cage and parallel to length of the individual chicken cage, the individual hybrid LED lighting comprising white beads and yellow beads in a regularly alternating manner, a ratio of the white beads and the yellow beads in the plurality of hybrid LED lightings is 0.2, an average light intensity of the plurality of hybrid LED lightings on underside of chicken cages or a floor associated with the chicken coop ranging from about 5 to about 30 Lux.

8. The hybrid LED lighting system of claim 7, wherein the white beads and the yellow beads of the plurality of hybrid LED lighting are arranged in a regularly alternating manner into at least one of a ring, straight line, triangle, square, trapezoid or rectangle.

9. A hybrid LED lighting system comprising:
- a plurality of windows of a chicken coop that are spaced along two sides of the chicken coop;
- a plurality of hybrid LED lightings mounted about 1.5 to about 4 meters away from ground, the plurality of hybrid LED lightings spaced along a plurality of chicken cages of the chicken coop, the plurality of hybrid LED lightings comprising white beads and yellow beads in a regularly alternating manner, a ratio of the white beads and the yellow beads in the plurality of hybrid LED lightings is 0.2, an average light intensity of the plurality of hybrid LED lightings on underside of chicken cages or a floor associated with the chicken coop ranging from about 5 to about 30 Lux.

10. The hybrid LED lighting system of claim 9, wherein the white beads and yellow beads of the plurality of hybrid LED lighting are arranged in a regularly alternating manner into at least one of a ring, straight line, triangle, square, trapezoid or rectangle.

\* \* \* \* \*